United States Patent

Jung et al.

[11] Patent Number: 5,810,108
[45] Date of Patent: Sep. 22, 1998

[54] FAIL SAFE DEVICE FOR REAR-WHEEL STEERING SYSTEM

[75] Inventors: Yeon-Goo Jung; Jun-Ho Min, both of Seoul, Rep. of Korea

[73] Assignee: Kia Motors Corporation, Seoul, Rep. of Korea

[21] Appl. No.: 676,765

[22] Filed: Jul. 8, 1996

[30] Foreign Application Priority Data

Mar. 29, 1996 [KR] Rep. of Korea .................... 96-9296

[51] Int. Cl.$^6$ ...................................... B62D 5/30
[52] U.S. Cl. ............................ 180/404; 180/445
[58] Field of Search .................................. 180/400, 404, 180/405, 407, 443, 444, 445

[56] References Cited

U.S. PATENT DOCUMENTS 5,027,276  6/1991  Morishita et al. .................. 180/404 X
5,448,480  9/1995  Rauner et al. ...................... 180/404 X
5,552,684  9/1996  Wada et al. ......................... 180/404 X

*Primary Examiner*—Kevin Hurley

[57] ABSTRACT

A fail safe device for a rear-wheel steering system prevents an abrupt return of a rear-wheel into a neutral position when the rear-wheel steering system malfunctions during vehicle operation to prevent an overshoot. A rear-wheel is steered by a DC motor according to a vehicle speed. A malfunction sensor senses rear-wheel steering system malfunction. A controller controls a back-electromotive force to be applied to the DC motor. The back-electromotive force is generated by revolution of the DC motor based on a signal which is sensed by the malfunction sensor when the rear-wheel is returned to a neutral position. Switching means applies the back-electromotive force to terminals which are positioned around the DC motor.

1 Claim, 2 Drawing Sheets

FAIL SAFE DEVICE FOR REAR-WHEEL STEERING SYSTEM

FIELD OF THE INVENTION

The present invention relates to a rear-wheel steering system. More particularly, it relates to a fail safe device which prevents an abrupt return of a rear-wheel caused by a spring for returning to a neutral position when a malfunction in the rear-wheel steering system occurs while a vehicle is traveling, thereby maintaining the rear-wheel in the neutral position in a final returning step.

DESCRIPTION OF PRIOR ART

Generally, a four-wheel steering system simultaneously steers the front and rear wheels. There is a common phase steering method and a reverse phase steering method in the four-wheel steering methods. The common phase steering method reduces vehicle yaw by steering the front and rear wheels in the same direction, and improves vehicle safety due to the reduced yawing. The reverse phase steering method achieves good steering at low speeds by steering the front and rear wheels in differential directions, and reduces a turning radius of vehicle.

By steering the rear-wheels according to both front-wheel angle and vehicle speed, the four-wheel steering system adjusts steering stablity of the vehicle at low speed and attains running safety of the vehicle at high speed.

According to the vehicle speed, the phase of the rear wheel steering angle should be changed to the reverse phase at a low speed or the common phase at a high speed.

A front-wheel steering system of an electronic control four-wheel vehicle has a rack-and-pinion method as a main steering function, wherein, a steering operation of the front-wheel is transferred to a rear-wheel steering controller by one output shaft.

A rear-wheel steering angle of an electronic control rear-wheel steering system is electronically controlled according to both a steering angle of a steering wheel and a vehicle speed. That is, a steering angle ratio of the rear-wheel to the front-wheel is electronically controlled according to the vehicle speed.

FIG. 1 is a cross-sectional view of a conventional rear-wheel steering system. As shown in FIG. 1, a torque of a direct current (hereinafter referred to as a DC) motor 10 is transmitted to a rotating shaft 30 through a timing belt 20, thereby steering the rear-wheel 40.

The rear-wheel steering system includes a fail safe device such as a return spring 50, as shown in FIG. 1. Thus, when a malfunction in the rear-wheel steering system occurs, a safety operation of the rear-wheel steering system is automatically achieved by the fail safe device such as with the return spring 50. The return spring 50 returns the rear-wheel to the neutral position when rear-wheel steering fails, whereby the vehicle running state is maintained in a two-wheel steering state (that is, a rear-wheel steering angle=0°).

In the conventional four-wheel steering vehicle, the steering angle of the rear wheel is mechanically limited by a maximum 7°, so that the steering angle of the rear-wheel cannot be exceeded beyond 7°.

When a power-supply of the DC motor 10 is cut off due to trouble with the rear-wheel steering system, the steering angle of the rear-wheel is released from the torque of the DC motor 10. Therefore, the rear-wheel 40 can be returned to the neutral position by the return spring 50.

When the rear-wheel is returned to neutral by the return spring 50 due to rear-wheel steering system malfunction which may be generated while the vehicle is driven at a high speed, an overshoot shown in FIG. 2 may be generated since a toe angle of the rear-wheel has a low frictional force. This overshoot causes a driver to feel uneasiness.

That is, when the rear-wheel steering system is out of order, the rear-wheel should be fixed at an angle such as when malfunction occurs, or should be return to the neutral position relative to that angle. However, since the rear-wheel overshoots due to the spring force of the return spring, the rear-wheel is swerved from an accurate neutral position, thereby causing an accident.

SUMMARY OF THE INVENTION

It is an object of the present invention to provide a fail safe device for a rear-wheel steering system which can prevent an abrupt return of a rear-wheel to a neutral position when the malfunction occurs while the vehicle is running, and thus prevents an overshoot.

In order to achieve this object, the fail safe controller for the rear-wheel steering system according to the present invention comprises: a DC motor for steering a rear wheel according to vehicle speed; a malfunction sensor for sensing trouble of a rear-wheel steering system; a controller for controlling a back-electromotive force to be applied to the DC motor, the back-electromotive force is generated by revolution of the DC motor based on a signal which is sensed by the trouble sensor when the rear-wheel is returned to a neutral position; and switching means for applying the back-electromotive force to terminals which are positioned around the DC motor.

BRIEF DESCRIPTION OF THE ATTACHED DRAWINGS

The preferred embodiment of the present invention will now be described more specifically with reference to the attached drawings, wherein.

DETAILED DESCRIPTION OF THE EMBODIMENT

A detailed description of the present invention will now be made referring to the accompanying drawings.

Figure 1:
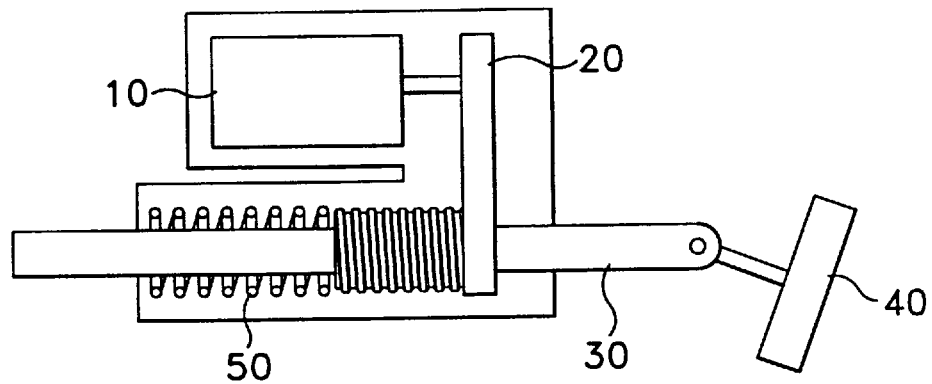
FIG. 1 is a cross-sectional view illustrating a conventional rear-wheel steering system.
Figure 2:
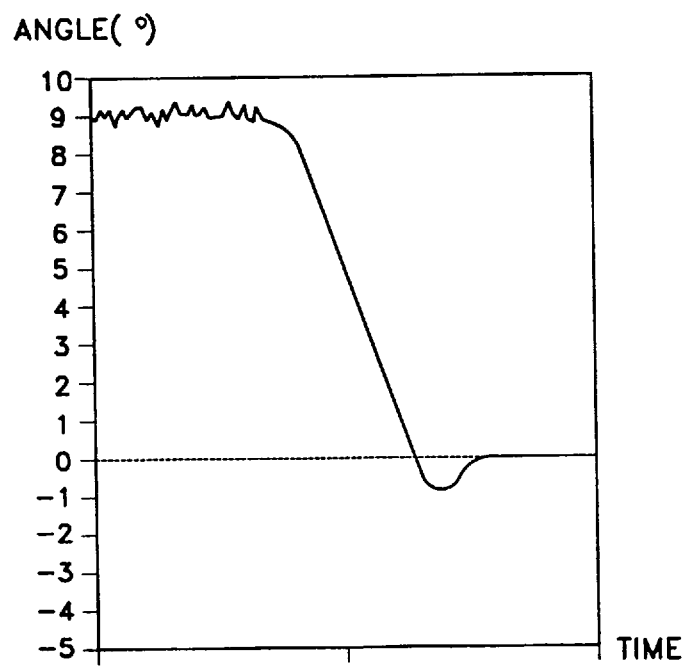
FIG. 2 is a graph illustrating a returning force generated when the rear-wheel returns to neutral due to malfunction of the conventional rear-wheel steering system shown in FIG. 1.
Figure 3:
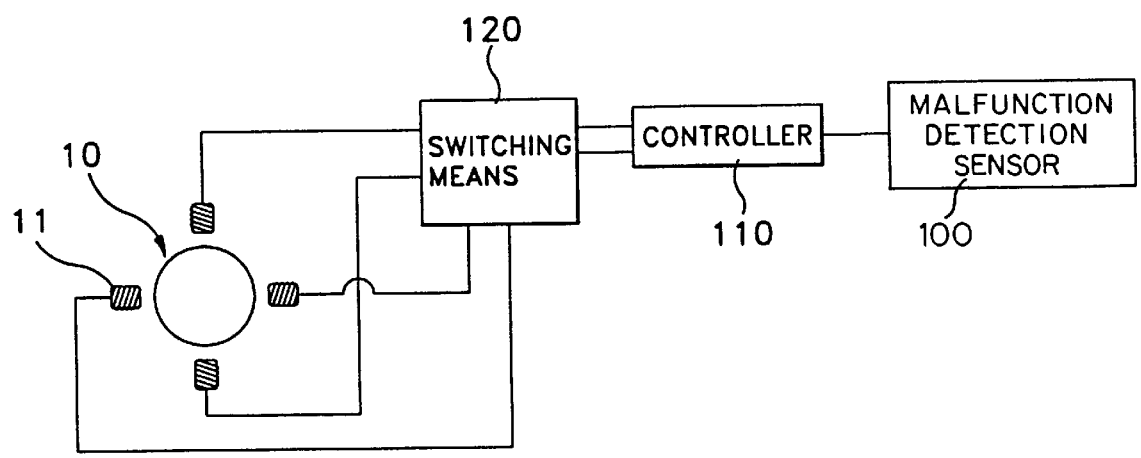
FIG. 3 is a block diagram illustrating the fail safe controller for the rear-wheel steering system in accordance with a preferred embodiment of the present invention.

Referring to FIG. 3, when running the vehicle, various types of malfunctions of a main motor, vehicle speed sensor, steering angle ratio sensor, and a microcontroller mounted in the vehicle, are sensed by corresponding sensors and are then inputted to a malfunction detection sensor 100.

Therefore, if a malfunction occurs in the rear-wheel steering system when running the vehicle, a controller 110 cuts off a power-supply applied to a DC motor 10 in order to steer a rear-wheel 40. The rear-wheel 40 is released from a constraint of the DC motor 10 by the cut-off power-supply of the DC motor 10, and then returned to a neutral position by a spring force of a return spring 50.

When the rear-wheel is returned to neutral position, the DC motor 10 is revolved in the opposite direction to the steering angle of the rear-wheel by the spring force of the return spring 50. The back-electromotive force is generated by this revolution of the DC motor 10. Simultaneously with generating the back-electromotive force, the switching means 120 such as a power relay is driven by the controller 110 and applies the back-electromotive force of the DC motor 10 to terminals 11 which are positioned around the DC motor 10. Therefore, when the rear-wheel is returned to the neutral position by the terminals 11 having the back-electromotive force, a reverse revolution of the DC motor 10 due to the rear-wheel returning has a load. As a result, since a returning speed of the rear-wheel to the neutral position decreases, a shock-absorbing of the spring force of the return spring 50 is achieved. By the shock absorbing, an overshoot released from a central point for returning the rear-wheel is prevented. At this time, for the shock absorbing, the back-electromotive force applied to the DC motor is lower than the spring force of the return spring 50.

As described above, during the vehicle's travelling along a curved road, if there is a malfunction in the rear-wheel steering system under the rear-wheel angle is changed to a constant angle, a back-electromotive force which is generated while the rear-wheel returns to neutral by the return spring of the rear-wheel steering system is applied to the reset terminal. As a result, the returning speed due to the spring force of the return spring is decreased, thereby preventing the overshoot.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A fail safe device for a rear-wheel steering system of a vehicle, comprising:

a DC motor connected to the rear-wheel steering system to steer a rear wheel as a function of vehicle speed;

a malfunction sensor connected for sensing a malfunction of the rear-wheel steering system;

a controller for controlling a back-electromotive force to be applied to the DC motor, the back-electromotive force being generated by revolution of the DC motor based on a signal which is sensed by the malfunction sensor when the rear-wheel is returned to a neutral position by the DC motor; and a switching arrangement connected to apply the back-electromotive force to terminals which are positioned around the DC motor.

* * * * *